(12) United States Patent
Moorti et al.

(10) Patent No.: US 9,247,439 B2
(45) Date of Patent: Jan. 26, 2016

(54) HIGH DATA THROUGHPUT WIRELESS LOCAL AREA NETWORK RECEIVER

(71) Applicant: Broadcom Corporation, Irvine, CA (US)

(72) Inventors: Rajendra Tushar Moorti, Mountain View, CA (US); Christopher J. Hansen, Los Altos, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 327 days.

(21) Appl. No.: 13/949,765

(22) Filed: Jul. 24, 2013

(65) Prior Publication Data
US 2013/0308486 A1 Nov. 21, 2013

Related U.S. Application Data

(63) Continuation of application No. 13/689,985, filed on Nov. 30, 2012, now Pat. No. 8,520,669, which is a continuation of application No. 12/426,911, filed on Apr. 20, 2009, now Pat. No. 8,363,642, which is a continuation of application No. 10/779,245, filed on Feb. 13, 2004, now Pat. No. 7,539,501.

(60) Provisional application No. 60/524,528, filed on Nov. 24, 2003.

(51) Int. Cl.
| | | |
|---|---|---|
| *H04W 84/12* | (2009.01) | |
| *H04B 1/38* | (2015.01) | |
| *H04B 1/06* | (2006.01) | |
| *H04W 24/02* | (2009.01) | |
| *H04W 28/18* | (2009.01) | |
| *H04W 72/08* | (2009.01) | |
| *H04L 5/00* | (2006.01) | |
| *H04L 27/26* | (2006.01) | |
| *H04W 24/00* | (2009.01) | |
| *H04W 28/06* | (2009.01) | |

(52) U.S. Cl.
CPC ............... *H04W 24/02* (2013.01); *H04B 1/38* (2013.01); *H04L 5/0048* (2013.01); *H04L 27/2647* (2013.01); *H04W 28/18* (2013.01); *H04W 72/085* (2013.01); *H04W 84/12* (2013.01); *H04L 5/0023* (2013.01); *H04L 27/2605* (2013.01); *H04W 24/00* (2013.01); *H04W 28/06* (2013.01); *Y10S 370/901* (2013.01); *Y10S 370/908* (2013.01)

(58) Field of Classification Search
CPC .... H04B 1/38; H04L 5/0048; H04L 27/2605; H04L 24/02; H04W 28/06
USPC .................. 370/329, 290; 455/511
See application file for complete search history.

(56) References Cited

U.S. PATENT DOCUMENTS

| | | | | |
|---|---|---|---|---|
| 6,940,913 B2 * | 9/2005 | Verbin | ............... | H04L 27/2602 375/260 |
| 2005/0136933 A1 * | 6/2005 | Sandhu | ............... | H04L 1/0075 455/450 |

*Primary Examiner* — Asad Nawaz
*Assistant Examiner* — Jason Harley
(74) *Attorney, Agent, or Firm* — Garlick & Markison; Bruce E. Stuckman

(57) ABSTRACT

A method for receiving a frame in a high data throughput wireless local area network begins by receiving a preamble of the frame via a channel in accordance with a default receiver filter mask. The processing continues by validating the preamble. The processing continues by, when the preamble is validated, interpreting the preamble to determine a high data throughput channel configuration. The processing continues by reconfiguring the default receiver filter mask in accordance with the high data throughput channel configuration to produce a reconfigured receiver filter mask. The processing continues by receiving a data segment of the frame in accordance with the reconfigured receiver filter mask.

20 Claims, 9 Drawing Sheets configuration spectral mask 100

| channel width | channel pass region | transition region | | | floor region |
|---|---|---|---|---|---|
| | | 1st attn | 2nd attn | 3rd attn | |
| 40 MHz | 36 to 40 MHz | -20 dBr per 1 to 5 MHZ | -8 dBr per 8 to 20 MHz | -17 dBr per 20 MHZ | <= -45 dBr |
| 20 MHz | 16 to 19 MHz | -20 dBr per 1.5 to 3 MHZ | -8 dBr per 10 MHZ | -12 dBr per 10 MHZ | <= -45 dBr |
| 10 MHz | 7 to 10 MHz | -20 dBr per 0.5 to 2 MHZ | -8 dBr per 5 MHZ | -12 dBr per 5 MHZ | <= -45 dBr |

| bits | channel configuration | | | |
| --- | --- | --- | --- | --- |
| | configuration | | | |
| | channel bandwidth | subcarriers | rate interpretation | space-time coding |
| 00001 | 20 MHz | 64 | 0 | 2 |
| 00010 | 20 MHz | 64 | 1 | 2 |
| 01000 | 40 MHz | 128 | 0 | 1 |
| 01001 | 40 MHz | 128 | 0 | 2 |
| 01010 | 40 MHz | 128 | 1 | 2 |
| 10000 | 10 MHz | 64 | 0 | 1 |
| 10001 | 10 MHz | 64 | 0 | 2 |
| 10010 | 10 MHz | 64 | 1 | 2 |

FIG. 9

HIGH DATA THROUGHPUT WIRELESS LOCAL AREA NETWORK RECEIVER

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 13/689,985, entitled "HIGH DATA THROUGHPUT WIRELESS LOCAL AREA NETWORK RECEIVER," filed Nov. 30, 2012, which claims priority pursuant to 35 U.S.C. §120, as a continuation, to the following U.S. Utility Patent Application:

a. U.S. Utility application Ser. No. 12/426,911, entitled "HIGH DATA THROUGHPUT WIRELESS LOCAL AREA NETWORK RECEIVER,"filed Apr. 20, 2009, issued as U.S. Pat. No. 8,363,642, which claims priority pursuant to 35 U.S.C. §120, as a continuation, to the following U.S. Utility Patent Application:

i. U.S. Utility application Ser. No. 10/779,245, entitled "HIGH DATA THROUGHPUT WIRELESS LOCAL AREA NETWORK RECEIVER," filed on Feb. 13, 2004, issued as U.S. Pat. No. 7,539,501, which claims priority pursuant to 35 U.S.C. §119(e) to the following U.S. Provisional Patent Application:

1. U.S. Provisional Application Ser. No. 60/524,528, entitled "CONFIGURABLE SPECTRAL MASK FOR USE IN A HIGH DATA THROUGHPUT WIRELESS COMMUNICATION," filed Nov. 24, 2003.

BACKGROUND OF THE INVENTION

1. Technical Field of the Invention

This invention relates generally to wireless communication systems and more particularly to high data throughput communications in such systems.

2. Description Of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The assigned channel, or channels, over which the direct or indirect communication occurs is defined by the standard, or standards, supported by the wireless communication devices. For example, IEEE 802.11 (a) and (g) provide a channel spectral mask for 20 MHz orthogonal frequency division multiplexing (OFDM) channels. The standards also define the manner in which devices communicate over the channel. For example, the IEEE 802.11 (a) and (g) standards define a frame structure for communicating via a channel in a WLAN. The frame includes a preamble and a variable length data segment. The preamble includes a short training sequence, a long training sequence, and a signal field, which provides rate information of the data and length of the data segment.

Each receiving wireless communication device uses the frame preamble for signal detection, automatic gain control adjustments, diversity determinations, frequency adjustments, timing synchronization, and channel and fine frequency offset estimation. Such a frame format allows the wireless communication devices of a WLAN to communicate in a very specific manner. This frame format, however, does not accommodate higher data throughput rates, with backward compatibility to existing WLAN equipment, and various wireless channel configurations.

Therefore, a need exists for a method and apparatus of receiving a new frame format that enables wireless communication devices to support a variety of wireless channel configurations and/or high throughput data rates.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 9 is a diagram of channel configurations in accordance with an embodiment of the present invention;

DETAILED DESCRIPTION OF THE INVENTION

Figure 1:
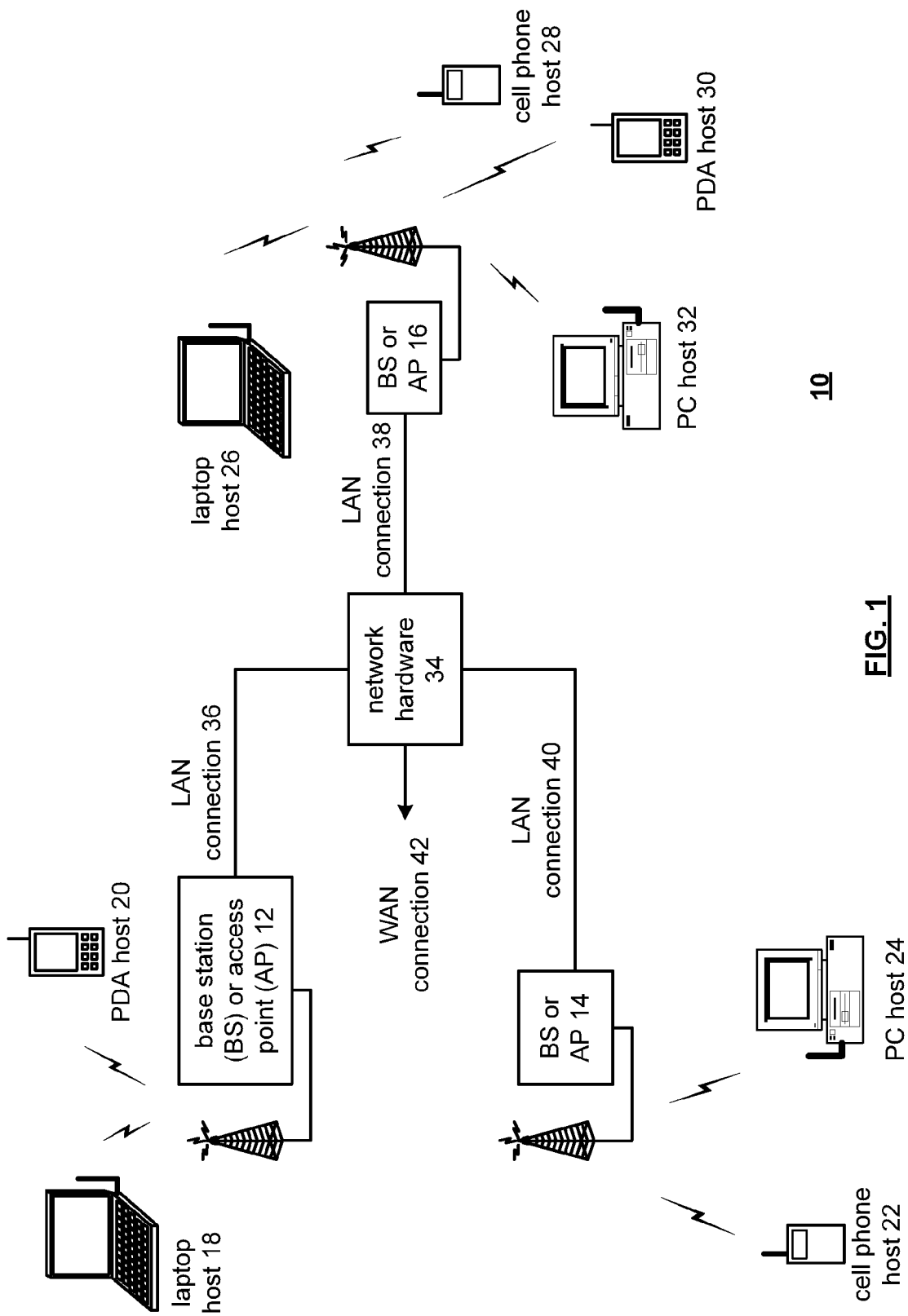
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area via one or more configurable channels within one or more frequency bands. Typically, the wireless communication devices register with a particular base station or access point 12-14 to receive services from the communication system 10. For direct connections (i.e., point-to-point communications), wireless communication devices communicate directly via an allocated channel of the configurable channels.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
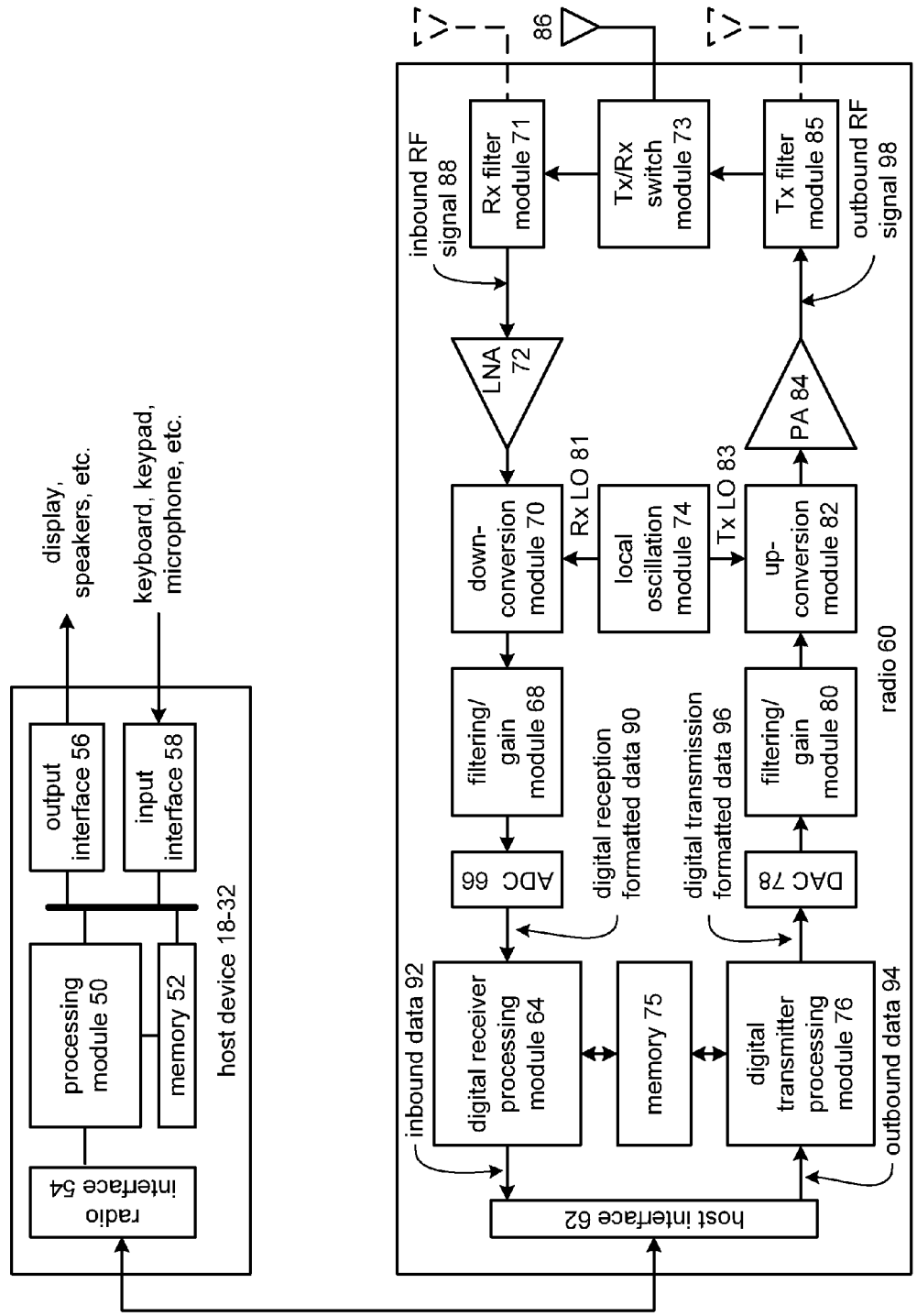
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver baseband functions and digital transmitter baseband functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz. Further, the digital transmission formatted data 96 will be based on the channel width of the RF channel on which the data 96 will ultimately be transmitted. For example, the channel width may be 10 MHz, 20 MHz, or 40 MHz. Continuing with the example, if the channel is an OFDM (orthogonal frequency division multiplexing) channel, a 10 MHz wide channel may include 32 subcarrier frequencies, a 20 MHz wide channel may include 64 subcarrier frequencies, and a 40 MHz wide channel may include 128 subcarrier frequencies, where the number of subcarriers used per channel is at least partially based on the spectral masked configured for the channel. Configuring the spectral mask will be described in greater detail with reference to FIGS. 3-6.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device. Note that the bandpass regions of the filters 80 and 85 are dependent upon the configured spectral mask for the RF transmission, which may be determined by the digital transmitter processing module 76.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. Note that the bandpass regions of the filters 71 and 68 are dependent upon the configured spectral mask for the RF transmission, which may be determined by the receiver processing module 64.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60 and the particular channel width of the channel. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
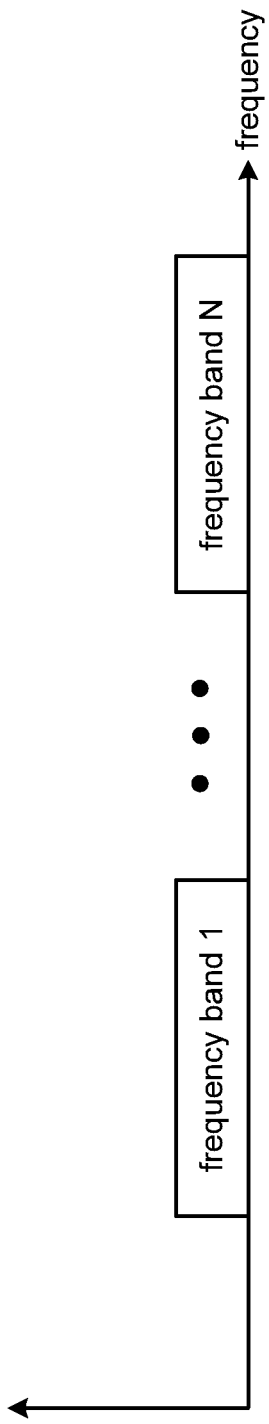
FIG. 3 is a diagram depicting frequency bands that may be used in accordance with the present invention.

FIG. 3 is a diagram depicting a plurality of frequency bands (e.g., frequency band 1 through frequency band N), which are defined by a governmental agency for particular wireless applications. For example, the Federal Communications Commission (FCC) defines, for the United States, frequency bands for specific uses and for which an FCC license is required (e.g., radio transmissions, television transmissions, etc.) and also defines frequency bands that are unlicensed and, as such, can be used for a variety of applications. For instance, the FCC has defined several frequency bands in the radio frequency spectrum as being unlicensed. Such unlicensed frequency bands include 902-928 MHz, 2.4-2.483 GHz and 5.75-5.85 GHz, which are collectively referred to as the ISM (Industrial Scientific Medical) band. Currently, the ISM band is used for in-building and system applications (e.g., bar code readers), industrial microwave ovens, wireless patient monitors, and wireless local area networks (WLAN). In general, the frequency bands of FIG. 3 include, but are not limited to, 2.400-2.4835 GHz, 2.471-2.497 GHz, 5.15-5.25 GHz, 5.25-5.35 GHz, 5.47-5.725 GHz, 5.725 GHz-5.825 GHz, 4.9-5.3 GHz, and 5.85-5.925 GHz.

Figure 4:
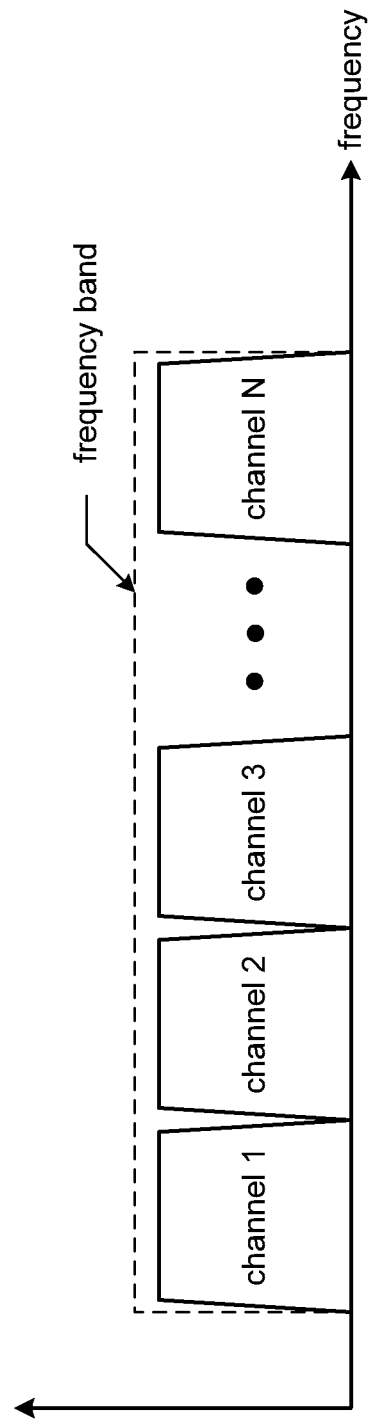
FIG. 4 is a diagram depicting channel partitioning of a frequency band in accordance with the present invention.

FIG. 4 is a diagram depicting a particular frequency band that is divided into a plurality of channels. In accordance with the present invention, the channel width of each channel is selectable. As such, for a given frequency band, the number of channels will vary depending on the selected channel width. For instance, in one embodiment of the present invention, the channel width may be selected in accordance with IEEE 802.11 (a) or (g), where IEEE 802.11 (a) provides wireless LAN operation specifications in the 5.15 to 5.35 GHz band. In general, the specified modulation schemes are based on Orthogonal Frequency Division Multiplexing (OFDM) which, for 802.11(a) divides the 5.15 to 5.35 GHz band into eight 20 MHz wide channels centered at 5.18, 5.20, 5.22, 5.24, 5.26, 5.28, 5.30, and 5.32 GHz. In another embodiment of the present invention, the 5.15 to 5.35 GHz band may be divided into eighteen 10 MHz wide channels, with the first channel centered at 5.165 GHz and the remaining eleven centered at 10 MHz increments therefrom. In yet another embodiment of the present invention, the 5.15 to 5.35 GHz band may be dividing into four 40 MHz wide channels, with the channels centered at 5.21, 5.25, 5.29, and 5.33 GHz. The same channel width selectivity may be applied to the 2.4-2.4835 GHz band covered by IEEE 802.11 (g), other frequency bands covered by an IEEE 802.11 standard, and/or any other wireless communication standard. The selectivity of the channel width provides for greater data throughput (e.g., at least twice the data rate of IEEE 802.11 (g)), for a diversity of applications, and/or for a single wireless communication device to support multiple wireless standards issued by various standard bodies, including governmental agencies.

Figures 5, 6:
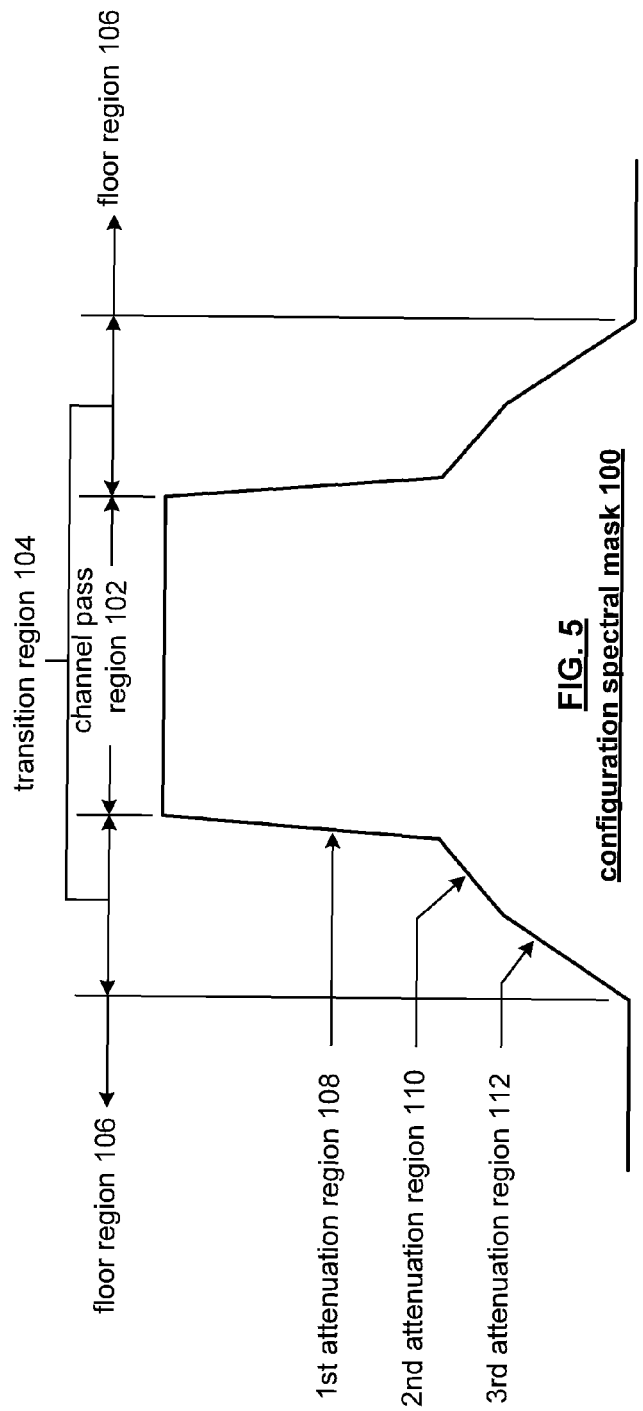
FIG. 5 is a diagram of a configurable spectral mask in accordance with an embodiment of the present invention.
FIG. 6 is a table providing parametric examples of the configurable spectral mask of FIG. 5.

FIG. 5 is a diagram of a configurable spectral mask 100 that includes a channel pass region 102, a transition region 104, and a floor region 106. The transition region 104 includes a first attenuation region 108, a second attenuation region 110, and a third attenuation region 112. Such a spectral mask 100 promotes interoperability, coexistence, and system capacity by limiting interference to adjacent and other channels for a wide variety of applications and/or standards. The out of band mask (e.g., the transition region 104 and the floor region 106) places a lower bound on interference levels that can be expected in receivers regardless of their particular implementation. In an effort to minimize the interference energy that appears on top of the desired signal, the out of band regions are made as small as possible.

To facilitate the above objective, the channel pass region 102, which encompasses the desired signal, is of a value as close to the channel bandwidth as feasible. The transition region 104, which bounds the adjacent channel interference and is limited by the bandwidth of the baseband processing modules 64 and 76 and the intermediate frequency mixing stage of the up-conversion module 82, is selected to minimize such interference (i.e., post IF inter-modulation distortion (IMD)). The floor region 106, which bounds other channel interference, which is outside the range of the filters and IMD limits and is generally limited by the local oscillation 74 phase noise, is selected based on achievable phase noise levels.

For instance, the transition region 104 should have a roll off based on the shoulder height of IMD, which may be assumed to be produced by a $3^{rd}$ order compressive non-linearity. Based on this assumption, the distorted transmit signal y(t) as a function of the ideal transmit signal x(t) can be expressed as: $y(t)=x(t)-f(Ax^3(t))$, where f( ) is a bandpass filter that removes any DC or harmonic signals produced by the non-linearity and $A=4/3(1/OIP_3)^2$, where OIP represents "Output $3^{rd}$ order intercept point", and in the frequency domain $Y(f)=X(f)-AX(F)*X(f)*X(f)$. As such, the distorted signal bandwidth will be no greater than three times the ideal signal bandwidth.

The floor region 106, which is limited by the local oscillator phase noise, may be based on L(f) convolved with the power spectral density of the ideal transmit signal, where L(f) is defined in IEEE std. 1139-1999 as the normalized phase noise spectral density and where $y(t)=x(t)*1(t)$ and $Y(f)=X(f)*L(f)$, where x(t) represents the ideal RF signal, 1(t) is a model of the phase nose generated in the local oscillator, y(t) represents the resulting signal, and Y(f) is the resulting signal in the frequency domain. Note that at 10 MHz or more from the carrier, phase noise spectrum is relatively flat. From this, a −123 dBc/Hz noise floor may be achieved for 20 MHz channels and a—126 dBc/Hz noise floor may be achieved for 40 MHz channels.

FIG. 6 is a table illustrating a few examples of values for a configurable spectral mask 100. While the table includes channel widths of 10, 20, and 40 MHz, one of average skill in the art will appreciate other channel widths may be used. Further, the transition region may include more or less attenuation regions than the three shown in FIG. 5.

Figure 7:
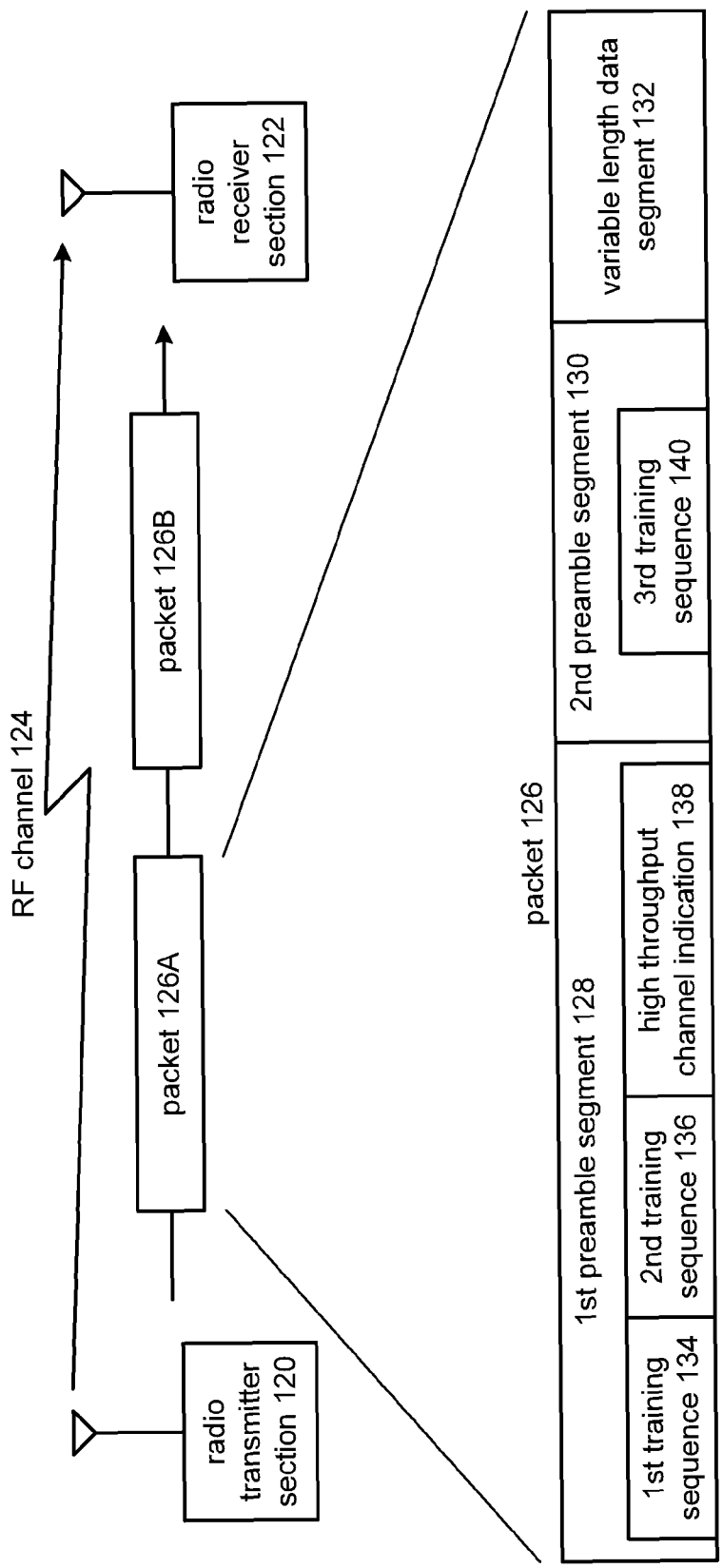
FIG. 7 is a diagram of transmitting frames via an RF channel in accordance with an embodiment of the present invention.

FIG. 7 is a diagram illustrating a radio transmitter section 120 transmitting frames 126A, 126B via a radio frequency (RF) channel 124 to a radio receiver section 122. The radio transmitter section 120 is in one wireless communication device and corresponds to the digital transmitter processing module 76, digital-to-analog converter 78, filter/gain module 80, up-conversion module 82, power amplifier 84 and transmit filter module 85 of the wireless communication device of FIG. 2. The radio receiver section 122, which is in another wireless communication device, corresponds to the digital receiver processing module 64, analog-to-digital converter 66, filter/gain module 68, down-conversion module 70, the low noise amplifier 72 and receive filter module 71 of the wireless communication device of FIG. 2. The channel 124 may be any one of the channels illustrated in FIG. 3 and may have any spectral mask configuration as described in co-pending patent application having a serial number of 60/524,528, entitled CONFIGURABLE SPECTRAL MASK FOR USE IN A HIGH DATA THROUGHPUT WIRELESS COMMUNICATION, with a filing date of Nov. 24, 2003.

The format of frames 126A, B includes a $1^{st}$ preamble section 128, a $2^{nd}$ preamble section 130, and a variable length data segment 132. The $1^{st}$ preamble training segment 128 includes a $1^{st}$ training sequence 134, a $2^{nd}$ training sequence 136 and a high throughput channel indication 138. The $2^{nd}$ preamble segment 130 includes a $3^{rd}$ training sequence 140. In one embodiment, the $1^{st}$ training sequence 134 and $2^{nd}$ training sequence 136 may correspond to the short and long training sequences of a preamble in accordance with IEEE802.11a or g. The high throughput channel indication 138 is set when the transmitting radio desires to use a high throughput channel configuration. If the high throughput channel indication is not set, the $2^{nd}$ preamble segment 130 would be ignored and the frame would be formatted similarly to legacy wireless local area networks that operate in accordance with IEEE802.11a, b, g, et cetera.

With the high throughput channel indication 138 set, the $3^{rd}$ training sequence 140 of the $2^{nd}$ preamble segment is implemented to fine-tune the radio receiver according to the particular channel configuration. The variable length data segment 132 includes a guard interval and associated data fields. The formatting of frame 126 is described in greater detail with reference to FIG. 6.

Figure 8:
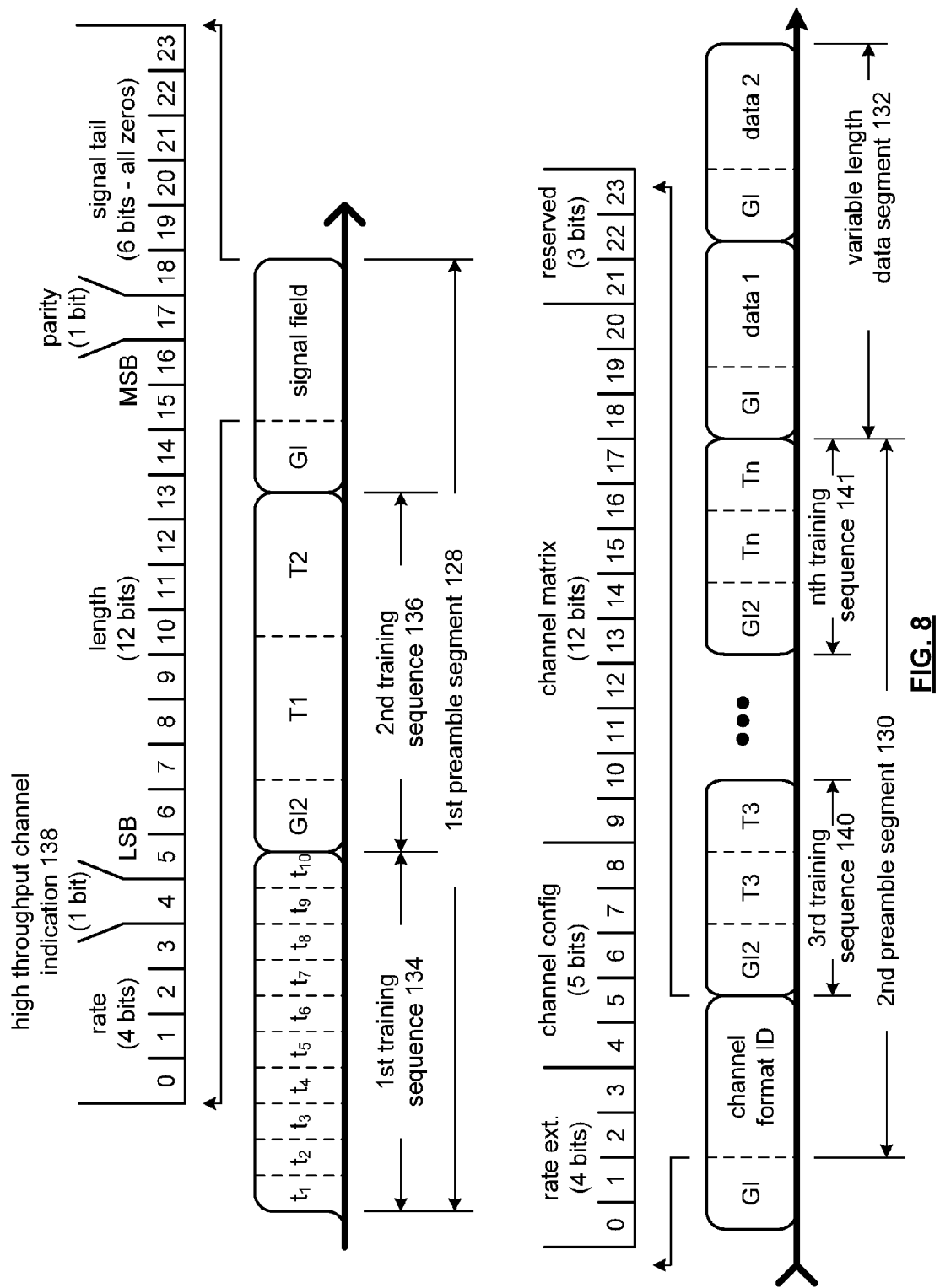
FIG. 8 is a diagram of a frame format in accordance with an embodiment of the present invention.

FIG. 8 illustrates the frame 126 in greater detail. As shown, the $1^{st}$ preamble segment 128 includes the $1^{st}$ training sequence 134, the $2^{nd}$ training sequence 136 and a signal field. The $1^{st}$ training sequence 134 includes 10 short training sequences that utilize only a portion of the sub-carriers of the particular channel. For instance, the channel configuration may be a 20 MHz channel bandwidth with 64 sub-carriers. The $1^{st}$ training sequence 134 may only use 12 of the 52 data sub-carriers to convey the corresponding short training sequence. The $2^{nd}$ training sequence 136 includes 2 long training sequences that may utilize 52 of the 52 data sub-carriers of a 20 MHz, 64 sub-carrier channel.

The signal field includes a guard interval (GI) and includes 24 bits of information. The $1^{st}$ 4 bits correspond to the rate of the data transmission, the next bit indicates the high throughput channel indication 138, the next 12 bits correspond to the length of the variable length data segment 132, bit 17 corresponds to the parity of the data and the remaining 6 bits correspond to a signal tail.

If the high throughput channel indication 138 is not set, the receiving radio will configure itself based on a default or $1^{st}$ channel configuration which may be the 20 MHz bandwidth channel utilizing 64 sub-carriers as currently defined in IEEE802.11a and/or g. If, however, the high throughput channel indication 138 is set, and the receiver is capable of alternative channel configurations, it will begin interpreting the $2^{nd}$ preamble.

The $2^{nd}$ preamble segment 130 includes a channel format identification field and a $3^{rd}$ training sequence 140. The channel identification field may include an additional 4-bits for rate information, 5-bits of channel configuration information, 12-bits to indicate a training matrix, and the remaining 3-bits may be reserved. As one of average skill in the art will appreciate, the 24-bits of the channel format identification field may be configured in a variety of ways to convey information to the receiving radio as to the bit rate of the high throughput data, the channel configuration on which the high throughput data will be conveyed, a diversity antenna arrangement, and a training matrix to produce dual RF transmissions over a single channel.

Once the channel format identification field has been processed, the receiving radio reconfigures itself based on the channel configuration and the data rate. Having reconfigured itself, the radio receives the $3^{rd}$ training sequence 140 that utilizes a majority of the sub-carriers in accordance with the new channel configuration. The channel configurations will be described in greater detail with reference to FIG. 7.

The rate bits in the $1^{st}$ preamble and $2^{nd}$ preamble may be used in combination to provide 8-bits of rate information and/or may be used separately to provide, in the case of dual communications over a single path, to indicate the rates of the separate communications.

The variable length data segment 132 includes a plurality of data segments and associated guard intervals (GI).

FIG. 9 is a table illustrating the various channel configurations, which may be utilized to convey the high data throughput communications. The channel configuration table includes a column for the bits to index the particular channel configuration and configuration information, which includes channel bandwidth, number of sub-carriers per channel, rate interpretation (i.e., are the rate bits in each of the preamble sections to be combined or used separately) and space time coding (i.e., the number of channel paths that the particular RF channel is supporting). In this example, there are 3 channel bandwidth options, 10 MHz, 20 MHz, and 40 MHz. The default operation of the wireless communication system in accordance with the present invention would operate as defined in IEEE802.11a or g. As is known, the channel configuration for 802.11A and/or G includes a 20 MHz channel bandwidth utilizing 64 sub-carriers where only 1 path is supported by the RF channel. Hence, the default channel configuration is not in the channel configuration information in the $2^{nd}$ preamble section.

If, however, a 20 MHz bandwidth channel is used that has spatial time coding that supports 2 paths via a single RF channel, then a higher data throughput is achieved. In one instance, the rate on both channels is the same corresponding to a rate interpretation of 0, which allows the eight bits (4 from the first preamble segment and 4 from the second preamble segment to be combined into one 8 bit code). If the rates for the 2 paths in space time coding are different, then the rate interpretation is 1. In this instance, the 4 bits of rate information in the $1^{st}$ preamble segment is used to indicate the rate of one of the channel paths and the 4 bits of rate information in the $2^{nd}$ preamble segment are used to indicate the rate of the other channel path.

As is further shown in the table, the 40 MHz channel bandwidth may include 128 sub-carriers and support 1 or 2 paths per channel. Similarly, the 10 MHz channel bandwidth has 64 sub-carriers and may support 1 or 2 channel paths.

Figure 10:
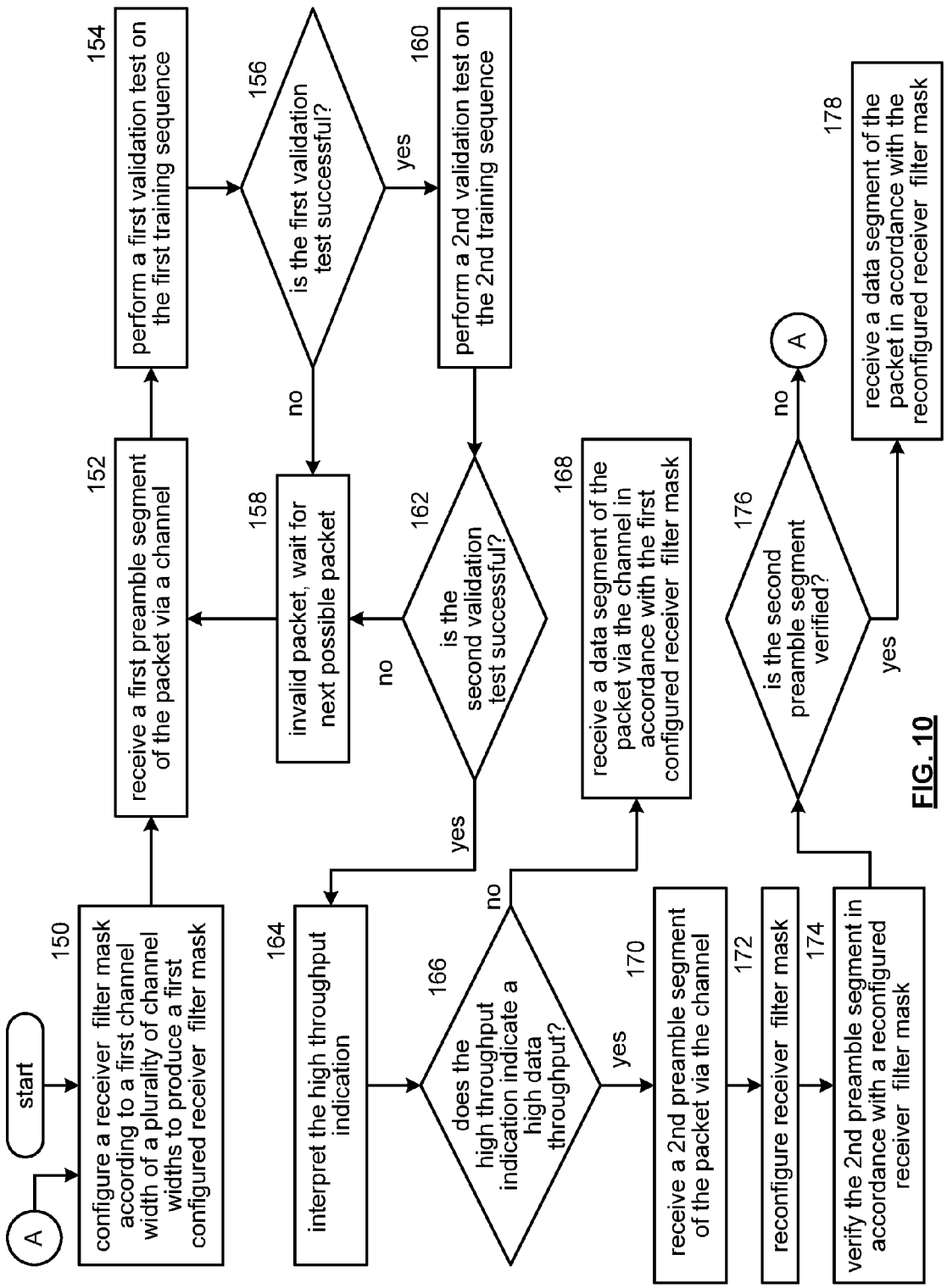
FIG. 10 is a logic diagram of a method for receiving a frame in a high data throughput wireless local area network in accordance with the present invention.

FIG. 10 is a logic diagram of a method for receiving a frame in a high data throughput wireless local area network. The processing begins at step 150, where, prior to receiving the frame, a radio receiver configures a receiver filter mask according to a first channel width of a plurality of channel widths to produce a first configured receiver filter mask. For example, the first channel width may correspond to a 20 MHz channel bandwidth as defined in IEEE 802.11 (a) and/or (g). In other words, the receiver will configure its receiver filter mask in accordance with the spectral mask with which the frame was transmitted.

The process then proceeds to step 152 where the radio receiver receives a first preamble segment of the frame via a channel. The first preamble segment includes a first training sequence, a second training sequence, and a high throughput indication. Note that the first training sequence is within a first set of subcarriers of the channel and the second training sequence is within a second set of subcarriers of the channel, wherein the first set of subcarriers is a subset of the second set of subcarriers in accordance with the first configured receiver filter mask. The process then proceeds to step 154 where the radio receiver performs a first validation test on the first training sequence. The process then proceeds to step 156 where the radio receiver determines whether the first validation test was successful. If not, the process proceeds to step 158 where the radio receiver deems the frame to be invalid and it waits for another frame to be received. When a new frame is received, the process continues at step 152.

If, however, the first validation test was successful, the process proceeds to step 160 where the radio receiver performs a second validation test of the second training sequence. The process then proceeds to step 162 where the radio receiver determines whether the second validation test was successful. If not, the process proceeds to step 158 where the radio receiver deems the frame to be invalid and it waits for another frame to be received. When a new frame is received, the process continues at step 152.

If, however, the second validation test was successful, the process proceeds to step 164 where the radio receiver interprets the high throughput indication. In one embodiment, this may be done by interpreting a channel format field of the second preamble to determine a high data throughput channel configuration. Note that the high data throughput channel configuration may indicate a second channel width of the plurality of channel widths, wherein the second channel width has $2^M$ subcarriers received via a single antenna and is greater in width than the first channel width; a third channel width of the plurality of channel widths, wherein the third channel has $2^K$ subcarriers received via the single antenna and is less in width than the first channel width; the first channel width having $2^N$ subcarriers received via multiple antennas; the second channel width having $2^M$ subcarriers received via the multiple antennas; and the third channel width having $2^K$ subcarriers received via the multiple antennas.

The process then proceeds to step 166 where the radio receiver determines whether the high throughput indication indicates a high data throughput. If not, the process proceeds to step 168 wherein the radio receiver receives a data segment of the frame via the channel in accordance with the first configured receiver filter mask. After receiving the remainder of the frame, the process reverts to step 150 for a subsequent frame.

If, however, the high throughput indication indicates a high data throughput, the process proceeds to step 170 wherein the radio receiver receives a second preamble segment of the frame via the channel. The process then proceeds to step 172 where the radio receiver interprets a configuration portion of the second preamble segment to determine a new mask configuration and then reconfigures the receiver filter mask accordingly.

The process then proceeds to step 174 where the radio receiver verifies a third training sequence of the second preamble segment to in accordance with a reconfigured receiver filter mask. This may be done in a variety of ways. In one embodiment, the second preamble segment is verified by: reconfiguring the receiver filter mask according to the second channel width to produce the reconfigured receiver filter mask, wherein the channel has a second channel width and includes $2^M$ subcarriers transmitted via the single antenna; and validating a second channel width single antenna training sequence of the second preamble segment in accordance with the reconfigured receiver filter mask.

In another embodiment, the second preamble segment is verified by: reconfiguring the receiver filter mask according to the third channel width to produce the reconfigured receiver filter mask, wherein the channel has a third channel width and includes $2^K$ subcarriers transmitted via the single antenna; and validating a third channel width single antenna training sequence of the second preamble segment in accordance with the reconfigured receiver filter mask.

In yet another embodiment, the second preamble segment is verified by: identifying a training matrix from the second preamble segment in accordance with the first configured receiver filter mask, wherein the channel has the first channel width and includes $2^N$ subcarriers transmitted via the multiple antennas; and validating a first channel width multiple antenna training sequence of the second preamble segment in accordance with the first configured receiver filter mask and the training matrix, wherein, when the first channel width multiple antenna training sequence is validated, the receiving the data segment includes receiving parallel data segments of the frame via the channel in accordance with the first receiver filter mask and the training matrix.

In further embodiment, the second preamble segment is verified by: reconfiguring the receiver filter mask according to the second channel width to produce the reconfigured receiver filter mask, wherein the channel has second channel width and includes $2^M$ subcarriers transmitted via the multiple antennas; identifying a training matrix from the second preamble segment in accordance with the reconfigured receiver filter mask; and validating a second channel width multiple antenna training sequence of the second preamble segment in accordance with the initial configured receiver filter mask and the training matrix, wherein, when the second channel width multiple antenna training sequence is validated, the receiving the data segment includes receiving parallel data segments of the frame in accordance with the reconfigured receiver filter mask via the channel in accordance with the reconfigured receiver filter mask and the training matrix.

In further embodiment, the second preamble segment is verified by: reconfiguring the receiver filter mask according to the third channel width to produce a reconfigured receiver filter mask, wherein the channel has the third channel width and includes $2^K$ subcarriers transmitted via the multiple antennas; identifying a training matrix from the second preamble segment in accordance with the reconfigured receiver filter mask; and validating a third channel width multiple antenna training sequence of the second preamble segment in accordance with the reconfigured receiver filter mask and the training matrix, wherein, when the third channel width multiple antenna training sequence is validated, the receiving the data segment includes receiving parallel data segments of the frame via the channel in accordance with the reconfigured receiver filter mask and the training matrix.

The process then proceeds to step 176 where the radio receiver determines whether the second preamble segment has been verified. If not, the process reverts to step 150. If the second preamble was verified, the process proceeds to step 178 wherein the radio receiver receives a data segment of the frame in accordance with the reconfigured receiver filter mask. Once the frame has been fully received, the process repeats at step 150 for a subsequent frame.

Figure 11:
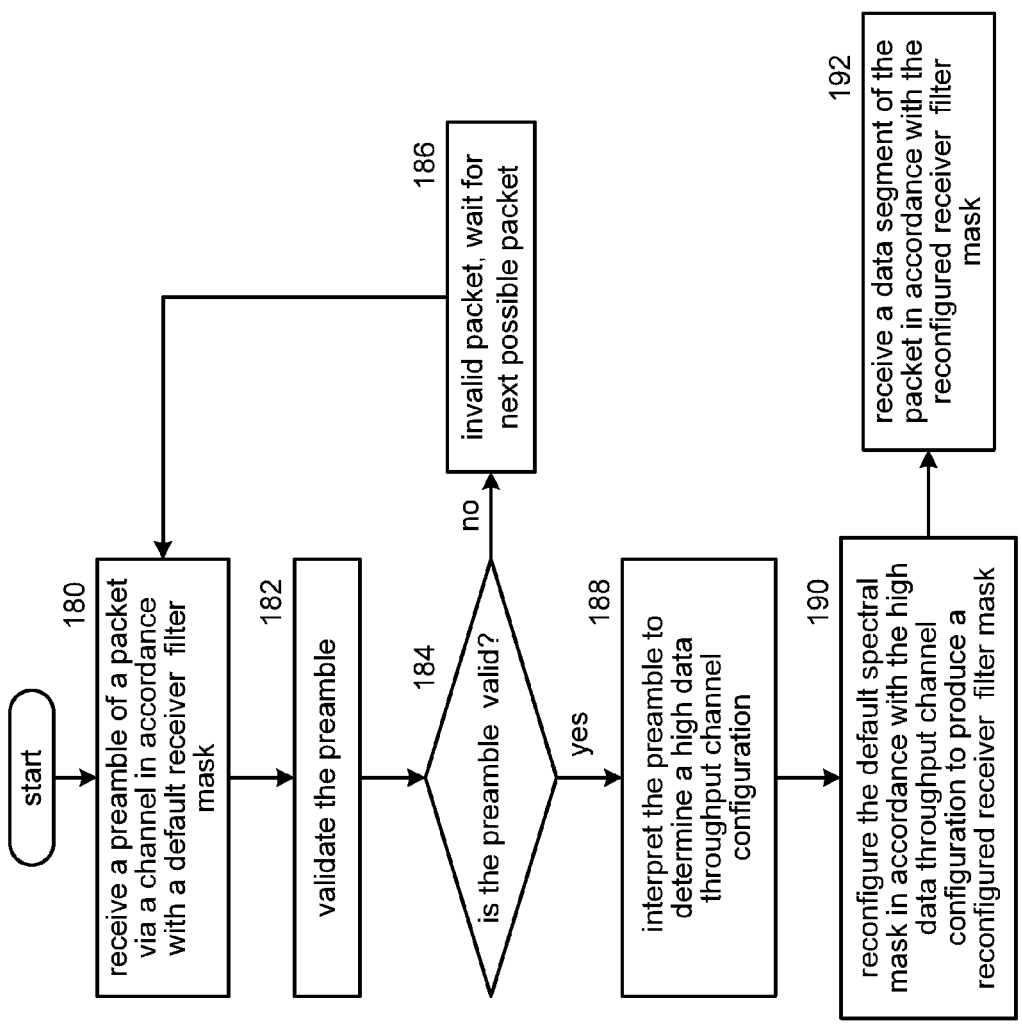
FIG. 11 is a logic diagram of an alternate method for receiving a frame in a high data throughput wireless local area network in accordance with the present invention.

FIG. 11 is a logic diagram of a method for receiving a frame in a high data throughput wireless local area network. The process begins at step 180 where a radio receiver receives a preamble of the frame via a channel in accordance with a default receiver filter mask. The process then proceeds to step 182 where the radio receiver validates the preamble. The process then proceeds to step 184 where the radio receiver determines whether the preamble is validated, which may be done in two parts: the first part using the default receiver filter mask and the second part using a reconfigured receiver filter mask. If it is not, the process proceeds to step 186 where the radio receiver determines that the current frame is invalid and waits for another frame to be received.

If the preamble is validated, the process proceeds to step 188 where the radio receiver interprets the preamble to determine a high data throughput channel configuration. The process then proceeds to step 190 where the radio receiver reconfigures the default receiver filter mask in accordance with the high data throughput channel configuration to produce a reconfigured receiver filter mask. The process then proceeds to step 192 where the radio receiver receives a data segment of the frame in accordance with the reconfigured receiver filter mask.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a radio receiver for processing frames in a high data throughput wireless local area network. As one of average skill in the art will appreciate, other embodiments may be derived from the teachings of the present invention without deviating from the scope of the claims.

What is claimed is:

1. A method for receiving a frame in a high data throughput wireless local area network, the method comprises:
operating a baseband processing device of an 802.11 compliant transceiver to:
prior to receiving the frame, configuring a receiver filter mask according to a first channel width of a plurality of channel widths to produce a first configured receiver filter mask;
receiving a first preamble segment of the frame via a channel, wherein the first preamble segment includes a first training sequence, a second training sequence, and a high throughput indication;
performing a first validation test on the first training sequence and a second validation test on the second training sequence;
when the first validation test and the second validation test are successful, interpreting the high throughput indication;
when the high throughput indication indicates a high data throughput, interpreting a channel format field of the frame to determine a high data throughput channel configuration, wherein the high data throughput channel configuration comprises at least one of:
a second channel width of the plurality of channel widths, wherein the second channel width has $2^M$ subcarriers received via a single antenna and is greater in width than the first channel width;
a third channel width of the plurality of channel widths, wherein the third channel has $2^K$ subcarriers received via the single antenna and is less in width than the first channel width;
the first channel width having $2^N$ subcarriers received via multiple antennas;
the second channel width having $2^M$ subcarriers received via the multiple antennas; or
the third channel width having $2^K$ subcarriers received via the multiple antennas;
reconfiguring the receiver filter mask according to the high data throughput channel configuration; and
receiving a data segment of the frame in accordance with the reconfigured receiver filter mask.

2. The method of claim 1 wherein the first training sequence is within a first set of subcarriers of the channel and the second training sequence is within a second set of subcarriers of the channel, wherein the first set of subcarriers is a subset of the second set of subcarriers in accordance with the first configured receiver filter mask.

3. The method of claim 1 further comprises:
when the high data throughput channel configuration is the second channel width having $2^M$ subcarriers transmitted via the single antenna, validating a second preamble segment includes:
reconfiguring the receiver filter mask according to the second channel width to produce the reconfigured receiver filter mask; and
validating a second channel width single antenna training sequence of the second preamble segment in accordance with the reconfigured receiver filter mask.

4. The method of claim 1 further comprises:
when the high data throughput channel configuration is the third channel width having $2^K$ subcarriers transmitted via the single antenna, validating a second preamble segment includes:
reconfiguring the receiver filter mask according to the third channel width to produce the reconfigured receiver filter mask; and
validating a third channel width single antenna training sequence of the second preamble segment in accordance with the reconfigured receiver filter mask.

5. The method of claim 1 further comprises:
when the high data throughput channel configuration is the first channel width having $2^N$ subcarriers transmitted via the multiple antennas, validating a second preamble segment includes:
identifying a training matrix from the second preamble segment in accordance with the first configured receiver filter mask; and
validating a first channel width multiple antenna training sequence of the second preamble segment in accordance with the first configured receiver filter mask and the training matrix, wherein, when the first channel width multiple antenna training sequence is validated, the receiving the data segment includes receiving parallel data segments of the frame via the channel in accordance with the first receiver filter mask and the training matrix.

6. The method of claim 1 further comprises:
when the high data throughput channel configuration is the second channel width having $2^M$ subcarriers transmitted via the multiple antennas, validating a second preamble segment includes:
reconfiguring the receiver filter mask according to the second channel width to produce the reconfigured receiver filter mask;
identifying a training matrix from the second preamble segment in accordance with the reconfigured receiver filter mask; and
validating a second channel width multiple antenna training sequence of the second preamble segment in accordance with the first configured receiver filter mask and the training matrix, wherein, when the second channel width multiple antenna training sequence is validated, the receiving the data segment includes receiving parallel data segments of the frame in accordance with the reconfigured receiver filter mask via the channel in accordance with the reconfigured receiver filter mask and the training matrix.

7. The method of claim 1 further comprises:
when the high data throughput channel configuration is the third channel width having $2^K$ subcarriers transmitted via the multiple antennas, validating a second preamble segment includes:
reconfiguring the receiver filter mask according to the third channel width to produce a reconfigured receiver filter mask;
identifying a training matrix from the second preamble segment in accordance with the reconfigured receiver filter mask; and
validating a third channel width multiple antenna training sequence of the second preamble segment in accordance with the reconfigured receiver filter mask and the training matrix, wherein, when the third channel width multiple antenna training sequence is validated, the receiving the data segment includes receiving parallel data segments of the frame via the channel in accordance with the reconfigured receiver filter mask and the training matrix.

8. The method of claim 1 further comprises:
when the high throughput indication does not indicate a high data throughput, receiving a data segment of the frame via the channel in accordance with the first configured receiver filter mask.

9. A radio receiver comprises:
a radio frequency (RF) front end operably coupled to convert inbound RF signals into inbound baseband signals;
a baseband processing module that is 802.11 compliant; and
a memory operably coupled to the processing module, wherein the memory stores operational instructions that cause the baseband processing module to:
prior to receiving a frame, configuring a receiver filter mask according to a first channel width of a plurality of channel widths to produce a first configured receiver filter mask;
receiving a first preamble segment of the frame via a channel, wherein the first preamble segment includes a first training sequence, a second training sequence, and a high throughput indication;
performing a first validation test on the first training sequence and a second validation test on the second training sequence;
when the first validation test and the second validation test are successful, interpreting the high throughput indication;
when the high throughput indication indicates a high data throughput, interpreting a channel format field of the frame to determine a high data throughput channel configuration, wherein the high data throughput channel configuration comprises at least one of:
a second channel width of the plurality of channel widths, wherein the second channel width has $2^M$ subcarriers received via a single antenna and is greater in width than the first channel width;
a third channel width of the plurality of channel widths, wherein the third channel has $2^K$ subcarriers received via the single antenna and is less in width than the first channel width;
the first channel width having $2^N$ subcarriers received via multiple antennas;
the second channel width having $2^M$ subcarriers received via the multiple antennas; or
the third channel width having $2^K$ subcarriers received via the multiple antennas;
reconfiguring the receiver filter mask according to the high data throughput channel configuration; and
receiving a data segment of the frame in accordance with the reconfigured receiver filter mask.

10. The radio receiver of claim 9, wherein the first training sequence is within a first set of subcarriers of the channel and the second training sequence is within a second set of subcarriers of the channel, wherein the first set of subcarriers is a subset of the second set of subcarriers in accordance with the first configured receiver filter mask.

11. The radio receiver of claim 9, wherein the memory further stores operational instructions that cause the baseband processing module to:
when the high data throughput channel configuration is the second channel width having $2^M$ subcarriers transmitted via the single antenna, validate a second preamble segment by:
reconfiguring the receiver filter mask according to the second channel width to produce the reconfigured receiver filter mask; and
validating a second channel width single antenna training sequence of the second preamble segment in accordance with the reconfigured receiver filter mask.

12. The radio receiver of claim 9, wherein the memory further stores operational instructions that cause the baseband processing module to:
when the high data throughput channel configuration is the third channel width having $2^K$ subcarriers transmitted via the single antenna, validate a second preamble segment by:
reconfiguring the receiver filter mask according to the third channel width to produce the reconfigured receiver filter mask; and
validating a third channel width single antenna training sequence of the second preamble segment in accordance with the reconfigured receiver filter mask.

13. The radio receiver of claim 9, wherein the memory further stores operational instructions that cause the baseband processing module to:
when the high data throughput channel configuration is the first channel width having $2^N$ subcarriers transmitted via the multiple antennas, validate a second preamble segment by:
identifying a training matrix from the second preamble segment in accordance with the first configured receiver filter mask; and
validating a first channel width multiple antenna training sequence of the second preamble segment in accordance with the first configured receiver filter mask and the training matrix, wherein, when the first channel width multiple antenna training sequence is validated, the receiving the data segment includes receiving parallel data segments of the frame via the channel in accordance with the first receiver filter mask and the training matrix.

14. The radio receiver of claim 9, wherein the memory further stores operational instructions that cause the baseband processing module to:
when the high data throughput channel configuration is the second channel width having $2^M$ subcarriers transmitted via the multiple antennas, validate a second preamble segment by:
reconfigure the receiver filter mask according to the second channel width to produce the reconfigured receiver filter mask;
identify a training matrix from the second preamble segment in accordance with the reconfigured receiver filter mask; and
validate a second channel width multiple antenna training sequence of the second preamble segment in accordance with the first configured receiver filter mask and the training matrix, wherein, when the second channel width multiple antenna training sequence is validated, the receiving the data segment includes receiving parallel data segments of the frame in accordance with the reconfigured receiver filter mask via the channel in accordance with the reconfigured receiver filter mask and the training matrix.

15. The radio receiver of claim 9, wherein the memory further stores operational instructions that cause the baseband processing module to:
when the high data throughput channel configuration is the third channel width having $2^K$ subcarriers transmitted via the multiple antennas, validate a second preamble segment by:
reconfiguring the receiver filter mask according to the third channel width to produce a reconfigured receiver filter mask;

identifying a training matrix from the second preamble segment in accordance with the reconfigured receiver filter mask; and validating a third channel width multiple antenna training sequence of the second preamble segment in accordance with the reconfigured receiver filter mask and the training matrix, wherein, when the third channel width multiple antenna training sequence is validated, the receiving the data segment includes receiving parallel data segments of the frame via the channel in accordance with the reconfigured receiver filter mask and the training matrix.

16. The radio receiver of claim 9, wherein the memory further stores operational instructions that cause the baseband processing module to:

when the high throughput indication does not indicate a high data throughput, process a data segment of the frame via the channel in accordance with the first configured receiver filter mask.

17. A radio receiver comprises:

a radio frequency (RF) front end operably coupled to convert inbound RF signals into inbound baseband signals in accordance with an 802.11 compliant protocol;

a processing module coupled to the RF front end and to a memory that stores operational instructions that cause the processing module to:

prior to receiving a frame, configuring a receiver filter mask according to a first channel width of a plurality of channel widths to produce a first configured receiver filter mask;

receiving a first preamble segment of the frame via a channel, wherein the first preamble segment includes a first training sequence, a second training sequence, and a high throughput indication;

performing a first validation test on the first training sequence and a second validation test on the second training sequence;

when the first validation test and the second validation test are successful, interpreting the high throughput indication;

when the high throughput indication indicates a high data throughput, interpreting a channel format field of the frame to determine a high data throughput channel configuration, wherein the high data throughput channel configuration comprises at least one of:

a second channel width of the plurality of channel widths, wherein the second channel width has $2^M$ subcarriers received via a single antenna and is greater in width than the first channel width;

a third channel width of the plurality of channel widths, wherein the third channel has $2^K$ subcarriers received via the single antenna and is less in width than the first channel width;

the first channel width having $2^N$ subcarriers received via multiple antennas;

the second channel width having $2^M$ subcarriers received via the multiple antennas; or the third channel width having $2^K$ subcarriers received via the multiple antennas;

reconfiguring the receiver filter mask according to the high data throughput channel configuration; and receiving a data segment of the frame in accordance with the reconfigured receiver filter mask.

18. The radio receiver of claim 17, wherein the first training sequence is within a first set of subcarriers of the channel and the second training sequence is within a second set of subcarriers of the channel, wherein the first set of subcarriers is a subset of the second set of subcarriers in accordance with the first configured receiver filter mask.

19. The radio receiver of claim 17, wherein the memory further stores operational instructions that cause the processing module to:

when the high data throughput channel configuration is the second channel width having $2^M$ subcarriers transmitted via the single antenna, validate a second preamble segment by:

reconfiguring the receiver filter mask according to the second channel width to produce the reconfigured receiver filter mask; and validating a second channel width single antenna training sequence of the second preamble segment in accordance with the reconfigured receiver filter mask.

20. The radio receiver of claim 17, wherein the memory further stores operational instructions that cause the processing module to:

when the high data throughput channel configuration is the third channel width having $2^K$ subcarriers transmitted via the single antenna, validate a second preamble segment by:

reconfiguring the receiver filter mask according to the third channel width to produce the reconfigured receiver filter mask; and validating a third channel width single antenna training sequence of the second preamble segment in accordance with the reconfigured receiver filter mask.

* * * * *